(12) United States Patent
Shaw et al.

(10) Patent No.: US 6,931,871 B2
(45) Date of Patent: Aug. 23, 2005

(54) BOOSTED AIR SOURCE HEAT PUMP

(75) Inventors: David N. Shaw, East Falmouth, MA (US); David S. Fishman, West Hartford, CT (US)

(73) Assignee: Shaw Engineering Associates, LLC, Rocky Hill, CT (US)

( * ) Notice: Subject to any disclaimer, the term of this patent is extended or adjusted under 35 U.S.C. 154(b) by 20 days.

(21) Appl. No.: 10/650,366

(22) Filed: Aug. 27, 2003

(65) Prior Publication Data

US 2005/0044866 A1 Mar. 3, 2005

(51) Int. Cl.[7] .................................................. F25B 49/00
(52) U.S. Cl. ........................ 62/228; 62/324.6; 62/228.3
(58) Field of Search ............................ 62/228.3, 196.1, 62/160, 117, 228.5, 324.1, 324.6, 228

(56) References Cited

U.S. PATENT DOCUMENTS

| | | | |
|---|---|---|---|
| 2,243,541 A | 5/1941 | Swart | |
| 2,352,581 A | 6/1944 | Winkler | |
| 2,646,212 A | 7/1953 | Kellie | |

(Continued)

FOREIGN PATENT DOCUMENTS

| | | |
|---|---|---|
| EP | 0 106 414 | 4/1984 |
| EP | 0 715 077 A2 | 6/1996 |
| EP | 0 718 568 A2 | 6/1996 |
| JP | 6-213170 | 8/1994 |
| WO | WO 97/32168 | 9/1997 |

OTHER PUBLICATIONS

Second Edition—"Applications of Thermodynamics"; Author: Bernard D. Wood; 1982 by Bernard D. Wood; 1991 reissued by Waveland Press, Inc.; pp. 218–222.

A Technical Handbook from SWEP; "Compact Brazed Heat Exchangers For Refrigerant Applications"; 1993; 1 page plus cover and back sheets.

(Continued)

*Primary Examiner*—Melvin Jones
(74) *Attorney, Agent, or Firm*—Cantor Colburn LLP

(57) ABSTRACT

A heat pump system is presented having a primary compressor, a booster compressor, a multi-step thermostat, an indoor coil, an outdoor coil, a refrigerant flow conduit connecting these elements is a closed loop system, and at least one pressure sensor positioned to always sense the refrigerant system low side pressure, which is commensurate with outdoor ambient air temperature in all heating modes of operation. The pressure sensor functions as an override and safety control to prevent or permit operation of the compressors, and also other system components, depending on outside air temperature. The primary compressor is preferably a multi-capacity compressor. A defrost energy transfer fluid is used in a defrost cycle.

31 Claims, 7 Drawing Sheets

MILD HEATING MODES
BOOSTER OFF

U.S. PATENT DOCUMENTS

| | | | |
|---|---|---|---|
| 2,663,164 A | | 12/1953 | Kurtz |
| 2,938,361 A | | 5/1960 | McNatt |
| 3,074,249 A | | 1/1963 | Henderson |
| 3,226,949 A | | 1/1966 | Gamache |
| 3,377,816 A | | 4/1968 | Berger |
| 3,500,962 A | | 3/1970 | Kocher |
| 3,719,057 A | | 3/1973 | Grant |
| 3,775,995 A | | 12/1973 | Conley et al. |
| 3,785,169 A | | 1/1974 | Gylland, Jr. |
| 3,852,974 A | | 12/1974 | Brown |
| 3,859,815 A | | 1/1975 | Kasahara |
| 4,033,738 A | * | 7/1977 | Merola et al. ............... 62/158 |
| 4,197,719 A | | 4/1980 | Shaw |
| 4,205,537 A | | 6/1980 | Dubberley |
| 4,236,876 A | | 12/1980 | Fraser et al. |
| 4,268,291 A | | 5/1981 | Cann |
| 4,306,420 A | | 12/1981 | Cann |
| 4,332,144 A | | 6/1982 | Shaw |
| 4,562,700 A | | 1/1986 | Atsumi et al. ............... 62/174 |
| 4,594,858 A | | 6/1986 | Shaw |
| 4,748,820 A | | 6/1988 | Shaw |
| 4,753,083 A | | 6/1988 | Sato |
| 4,787,211 A | | 11/1988 | Shaw |
| 4,798,059 A | * | 1/1989 | Morita ............... 62/228.4 |
| 4,833,893 A | | 5/1989 | Morita |
| 4,947,655 A | | 8/1990 | Shaw |
| 4,962,647 A | * | 10/1990 | Kuwahara ............... 62/156 |
| 5,062,274 A | | 11/1991 | Shaw |
| 5,094,085 A | | 3/1992 | Irino |
| 5,095,712 A | | 3/1992 | Narreau |
| 5,123,254 A | | 6/1992 | Inoue et al. |
| 5,191,776 A | | 3/1993 | Severance et al. |
| 5,220,806 A | | 6/1993 | Jaster et al. |
| 5,236,311 A | | 8/1993 | Lindstrom |
| 5,269,151 A | * | 12/1993 | Dinh ............... 62/81 |
| 5,303,561 A | | 4/1994 | Bahel et al. |
| 5,410,889 A | | 5/1995 | Sjoholm et al. |
| 5,626,027 A | | 5/1997 | Dormer et al. |
| 5,657,637 A | | 8/1997 | Mertens |
| 5,839,886 A | | 11/1998 | Shaw |
| 5,894,739 A | | 4/1999 | Temos |
| 5,927,088 A | | 7/1999 | Shaw |
| 6,276,148 B1 | | 8/2001 | Shaw |

OTHER PUBLICATIONS

"Modern Refrigerating Machines"; Author: I. Cerepnalkovski; Elsevier Science Publishers; 1991; pp. 47–48.

"Refrigeration Principles and Systems—An Energy Approach"; Author: Edward G. Pita; Business News Publishing Company; 1991; pp. 243–245.

"Survey and Comparison of Interstage Cooling Systems for Two–Stage Compression"; Data Sheet, No. 20; May 1979; 3 Pgs.

"Standard Refrigeration and Air Conditioning Questions & Answers—Third Edition"; Authors: S. M. Elenka and Q.W. Minich; McGraw–Hill, Inc.; 1983, 1973, 1961; pp. 28–31, 50–53.

"Thermal Environmental Engineering—Second Edition"; Author: James L. Threlkeld; Prentice–Hall, Inc.; 1970, 1962; pp. 61–70.

"Theory of Mechanical Refrigeration"; Author: N.R. Sparks; McGraw–Hill Book Company, Inc., 1938; pp. 111–127.

* cited by examiner

MILD HEATING MODES

BOOSTER OFF

MAXIMUM HEATING MODE
BOOSTER ON

**MAXIMUM HEATING MODE
BOOSTER & ECONOMIZER ON**

MAXIMUM HEATING MODE

BOOSTER & ECONOMIZER ON

COOLING & NORMAL DEFROST MODES

BOOSTER OFF

WATER DEFROST MODE
BOOSTER OFF

TYPICAL SYSTEM OPERATING SEQUENCES WITH VARIOUS INDOOR THERMOSTATS

SHOWN OPERATING MODES ARE CALLED BY THE STEPS THAT ARE AVAILABLE ON THE THREE SHOWN INDOOR THERMOSTATS**

| VARIOUS SWITCH STEP COMBINATIONS THAT ARE AVAILABLE WITH OVER THE COUNTER THERMOSTATS*** | | MODE 1 T/S STEP CALLS PARTIAL PRIMARY | MODE 2 T/S STEP CALLS FULL PRIMARY | MODE 3 T/S STEP ADDS THE BOOSTER | MODE 4 T/S STEP ADDS THE ECONOMIZER | MODE 5 T/S STEP ADDS ELECTRIC RESISTANCE |
|---|---|---|---|---|---|---|
| T1 | 1C & 2H STEPS AVAIL. | NA | C1 or H1 | H2 | NA | NA |
| T2 | 2C & 2H STEPS AVAIL. | C1 | C2 or H1 | H2 | NA | NA |
| T3 | 2C & 3H STEPS AVAIL. | C1 | C2 or H1 | H2 | NA | H3 |
| T3 | 2C & 3H STEPS AVAIL. | C1 or H1 | C2 or H2 | H3 | NA | NA |
| T3 | 2C & 3H STEPS AVAIL. | C1 | C2 or H1 | H2 | H3 | NA |
| T3 | 2C & 3H STEPS AVAIL. | C1 | C2 or H1 | H2* | NA | H3 |

***C1 & C2 MEAN COOLING STEPS 1 & 2. H1, H2, & H3 MEAN HEATING STEPS 1, 2, & 3.

**THE SENSOR (OF LOW SIDE PRESSURE) SHOWN ON FIGURES 1 - 6 PREVENTS UNNECESSARY, INEFFICIENT, AND UNSAFE OPERATION OF MODES 1, 3, 4, & 5 DURING OUTDOOR TEMPERATURES NOT SUITABLE FOR THOSE MODES.

*H2 ALSO CALLS THE ECONOMIZER SIMULTANEOUSLY IN THIS PARTICULAR SEQUENCE.

FIGURE 8

BOOSTED AIR SOURCE HEAT PUMP

BACKGROUND

This invention relates to air source heat pumps, and especially to air source heat pumps suitable for use in normally colder climates. This invention is a modification and improvement to the inventions in prior U.S. Pat. Nos. 6,276,148 and 5,927,088 in that this invention presents a somewhat simpler and less expensive air source heat pump system. The entire contents of my prior U.S. Pat. Nos. 6,276,148 and 5,927,088 are incorporated herein by reference.

Heat pump capacity is understood in the art to be the amount of heat per unit time delivered by a heat pump system. An effective heat pump system must deliver adequate capacity with low or falling outdoor temperature, while avoiding the delivery of too much capacity when the outdoor temperature warms up. Heat pumps that are designed to deliver sufficient capacity at very cold outdoor temperatures may have the inherent problem of delivering too much capacity when the outdoor temperature warms up, because more energy is available to be obtained from the warmer outdoor air. This may cause system inefficiencies as the system heat exchangers become overloaded and compressor power consumption rises to inefficient levels. In extreme cases, safety controls may cause the compressor to stop running.

My prior U.S. Pat. Nos. 6,276,148 and 5,927,088 disclose systems for adjusting capacity in response to decreases and/or increases in outdoor ambient temperature. This involves primary and booster compressors connected in series and a microprocessor which responds to a sensed parameter commensurate with outdoor ambient air temperature to allow sequences of compressor operation for capacity levels consistent with heating and/or cooling requirements and consistent with efficient and safe operation of the system. While the systems of my prior patents are effective for their intended purpose, and particularly for use in very cold climates, a need exists for a simpler and less expensive system.

SUMMARY OF THE INVENTION

As with prior U.S. Pat. Nos. 6,276,148 and 5,927,088, the present invention employs a primary and a booster compressor in series. In the simplest embodiment of this invention, both compressors may be single speed compressors. For the primary compressor, however, at least a two speed or unloadable compressor is preferred Heating and cooling system control is achieved with a multi-step indoor thermostat employed in conjunction with a refrigerant system low side pressure sensor that is commensurate with outdoor ambient temperature. The multi-step thermostat has settings that call for various steps of heating or cooling operation; and the low side pressure sensor operates to prevent unnecessary, unsafe and/or inefficient operation of the system. The complication and expense of a microprocessor can be eliminated.

The present invention also includes a circulating defrost energy transfer fluid system (as defined herein) for a defrost cycle for the heat pump mode of operation. Instead of having to use resistance heating while pulling heat out of the heated indoor air for the defrost cycle, the present invention utilizes a defrost energy transfer fluid for heat exchange to add thermal energy to vaporize the circulating refrigerant to effect the defrost operation. This eliminates the necessity of using electric resistance heating, thereby avoiding cold drafts during the defrost cycle.

BRIEF DESCRIPTION OF THE DRAWINGS

Referring now to the drawings, in which similar elements are numbered alike in the several figures:

FIG. 6 is a table showing various possible heating and cooling modes of operation for the system of the present invention.

DESCRIPTION OF THE PREFERRED EMBODIMENT

Figure 1:
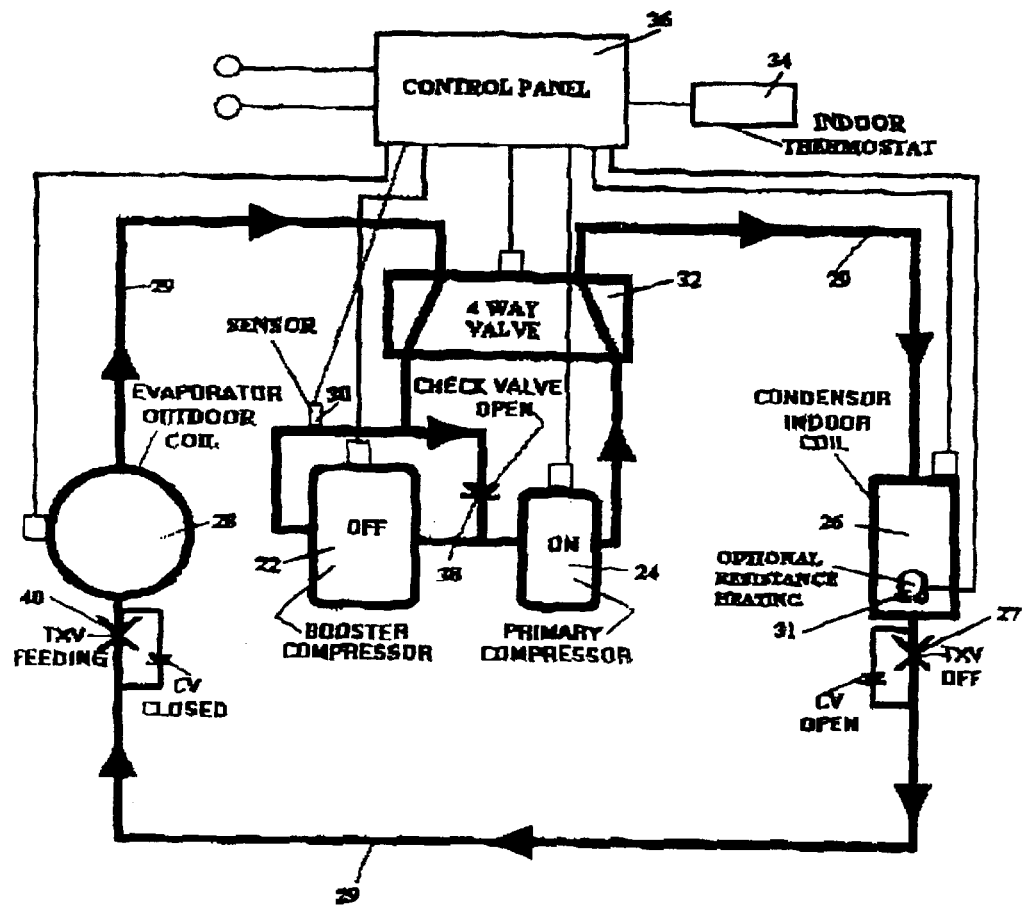
FIG. 1 is a schematic diagram of the heat pump system of the present invention in the lowest heating capacity modes of operation where only the primary compressor is operating.
Figure 2:
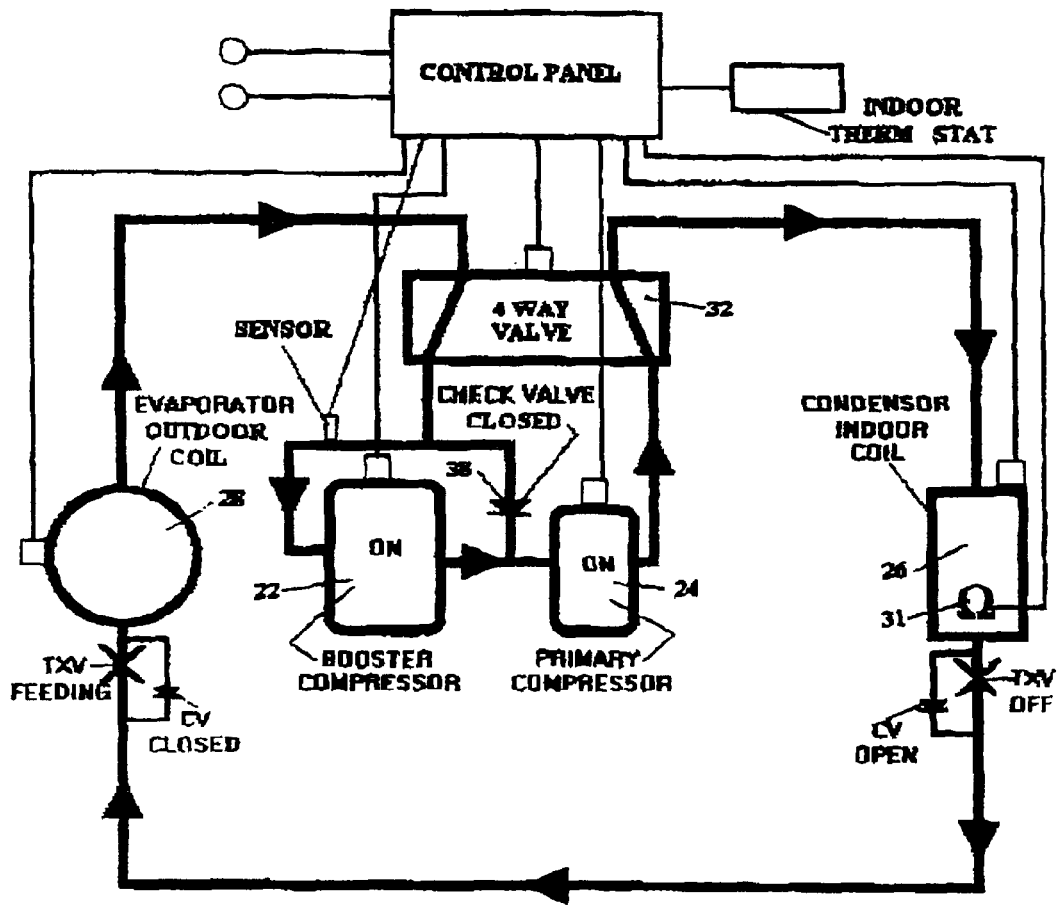
FIG. 2 is a schematic diagram of the heat pump system of the present invention in the next higher heating capacity mode of operation in which both the primary and booster compressors are operating.
Figure 3:
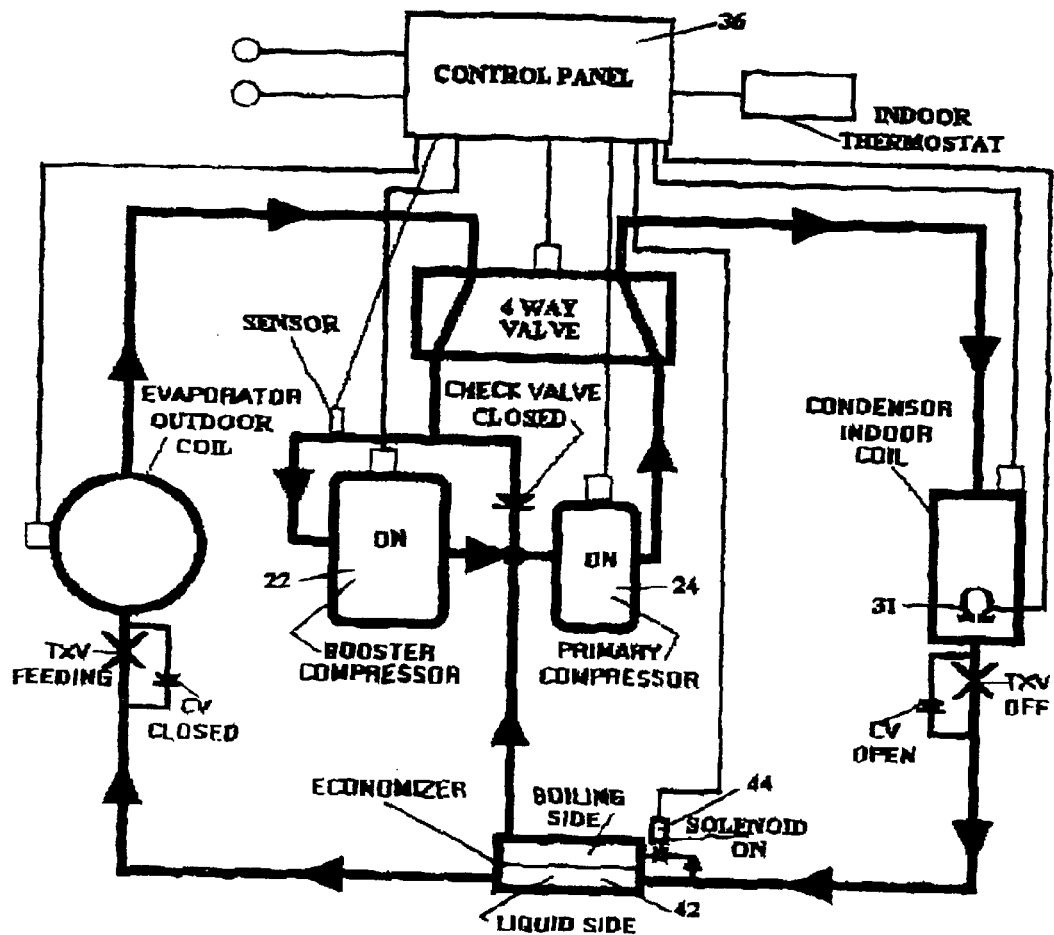
FIG. 3 is a schematic diagram of the heat pump system of the present invention in the next higher heating capacity mode of operation in which the primary and booster compressors and economizer are all operating.

Referring to FIGS. 1, 2 and 3, a closed loop heat pump system is shown. The system has a booster stage compressor 22, a primary compressor 24, an indoor coil or condenser 26 which delivers heat to a space to be heated, an outdoor coil or evaporator 28, and conduit means 29 connecting these elements in a closed loop circuit. The system also has a refrigerant system pressure sensor 30, the output of which is commensurate with outdoor ambient air temperature. Pressure sensor 30 is located in a position so that it is always exposed to the refrigerant low pressure side of the system. The heat pump system also has a four way valve 32 to reverse the direction of refrigerant flow when the system switches from the heating mode to the cooling mode, and vice-versa; an indoor thermostat 34 to select and sense the temperature of the air in the space to be heated (or cooled); and a control panel/mini-microprocessor 36 for receiving signals from the thermostat and pressure sensor 30 and for interpreting those signals and directing electric power to system components as required. The foregoing are the basic components of the closed loop heat pump system.

Booster compressor 22 and primary compressor 24 are connected in series when both are operating. Both compressors may be single speed and single capacity units. However, it is preferred that primary compressor 24 be at least a two speed or an unloadable compressor. For the purposes of this invention, the term "multi-capacity compressor" will mean any compressor that has more than one speed or that is unloadable.

Indoor thermostat 34 is any of the commercially available thermostats that are capable of multiple steps for calling for heating and/or cooling steps. In its simplest configuration, the thermostat will be designated as T1 and will have two heating steps, H1 and H2, and one cooling step, C1, (such as a T8511G 1021 available from Honeywell; it may also be a thermostat designated as T2 having two heating steps, H1 and H2, and two cooling steps, C1 and C2, (such as T8511M 1002 available from Honeywell; or it may be a thermostat designated T3 having three heating steps, Hi, H2 and H3, and two cooling steps, C1 and C2, (such as T8611M 2025 available from Honeywell).

In the following discussion, heating operation will be discussed first, and then cooling operation will be discussed.

FIG. 1 shows the system in its simplest mode of heating operation. Thermostat 34 is calling for the first step of heating operation. If both primary compressor 24 and booster compressor 22 are single speed and non-unloadable compressors, the signal will be sent from thermostat 34 to control panel 36 to deliver electric power to operate primary compressor 24 full on. Check valve 38 will be open, and booster compressor 22 will be off. This is indicated as Mode 2 in line T1 of FIG. 6, where T1 is a thermostat type having two heating steps and one cooling step, and the system is operating at H1. (This system does not operate in Mode 1, because the primary compressor is not capable of partial capacity operation.) The path of refrigerant flow is as shown by the arrows from primary compressor 24, through four way valve 32, to indoor coil 26, bypassing expansion valve 27, to expansion valve 40 and outdoor coil 28, and then through four way valve 32 back to the inlet to primary compressor 24. Air handlers and/or fans for indoor coil 26 and outdoor coil 28 are not shown.

Referring to FIG. 2, if the system capacity is insufficient to satisfy thermostat 34, the thermostat will call for the second heating step H2. This will result in control panel 36 sending electric power to operate booster compressor 22 full on. This is indicated at line T1, Mode 3 in FIG. 6, where the system is operating at H2. Check valve 38 is closed, and refrigerant flow will then be from four way valve 32 to booster compressor 22, and then from the booster compressor 22 to primary compressor 24, and then through the system as described above.

Thermostat T2 in FIG. 6 has two heating and two cooling steps. As indicated on the T2 line of FIG. 6, Modes 2 and 3, the heating operation with this thermostat is the same as for thermostat T1. However, for the two cooling steps of the T2 thermostat, the primary compressor 24 is a multi-capacity compressor to accomplish the two cooling steps.

Several modes of heating operation are possible with a T3 thermostat. For all T3 heating modes, primary compressor 24 is a multi-capacity compressor. As indicated in the first T3 line in FIG. 6, Modes 2 and 3 can be the same as for a T1 or T2 thermostat. That is, the first heating step, H1, results in primary compressor 24 being full on (booster off) and the second heating step, H2, results in adding booster compressor 22 full on, so that both compressors are full on. If system capacity is insufficient to satisfy the thermostat T3, the third heating step of the thermostat, H3, will result in adding electric resistance or other back-up heating 31 to the system (Mode 5).

Referring to the second T3 line in FIG. 6, in Mode 1 the first heating step, H1, results in operation of primary compressor 24 at partial capacity. In Mode 2, heating step H2 results in full capacity operation of primary compressor 24. In Mode 3, heating step H3 results in adding booster compressor 22 to the system, so that the system has the heating capacity of the booster and the full primary compressors.

Referring both to FIG. 3 and the third T3 line in FIG. 6, an economizer 42 is added to the heating system. At Mode 2, heating step H1 causes full capacity operation of primary compressor 24; and at Mode 3, heating step H2 adds the operation of the booster compressor. At Mode 4, heating step H3 results in activation of the economizer. This is effected by delivery of an electrical signal from control panel 36 to solenoid 44 to bleed some of the liquid refrigerant to the boiling side of the economizer, from which that bled refrigerant is then delivered to an interstage location between the booster and primary compressors after being vaporized in the economizer. Operation of the economizer is more fully discussed in my prior patents U.S. Pat. Nos. 6,276,148 and 5,927,088.

The fourth T3 line in FIG. 6 represents a system in which electrical resistance or other back-up heat is added to the system of FIG. 3. As indicated in the fourth T3 line of FIG. 6, this system is configured so that the H2 heating step calls for both booster compressor 22 and economizer 42 to be activated at Mode 2 in response to heating step H2. At Mode 5, if the heating capacity of the system is not sufficient to satisfy the thermostat, the heating step H3 adds electric resistance (or other backup) heat to the system.

While backup resistance heat 31 is called for or operated at Mode 5 for the first and fourth T3 lines of FIG. 6, it will also be understood that backup resistance heat can be manually selected with any of the thermostats.

Rate of change thermostats are also now available where the thermostat steps are activated when the rate of change of the temperature of the indoor air being heated (or cooled) does not meet a predetermined standard. Such rate of change thermostats can also be used with the present invention, provided they have at least two heating steps and one cooling step.

Figure 4:
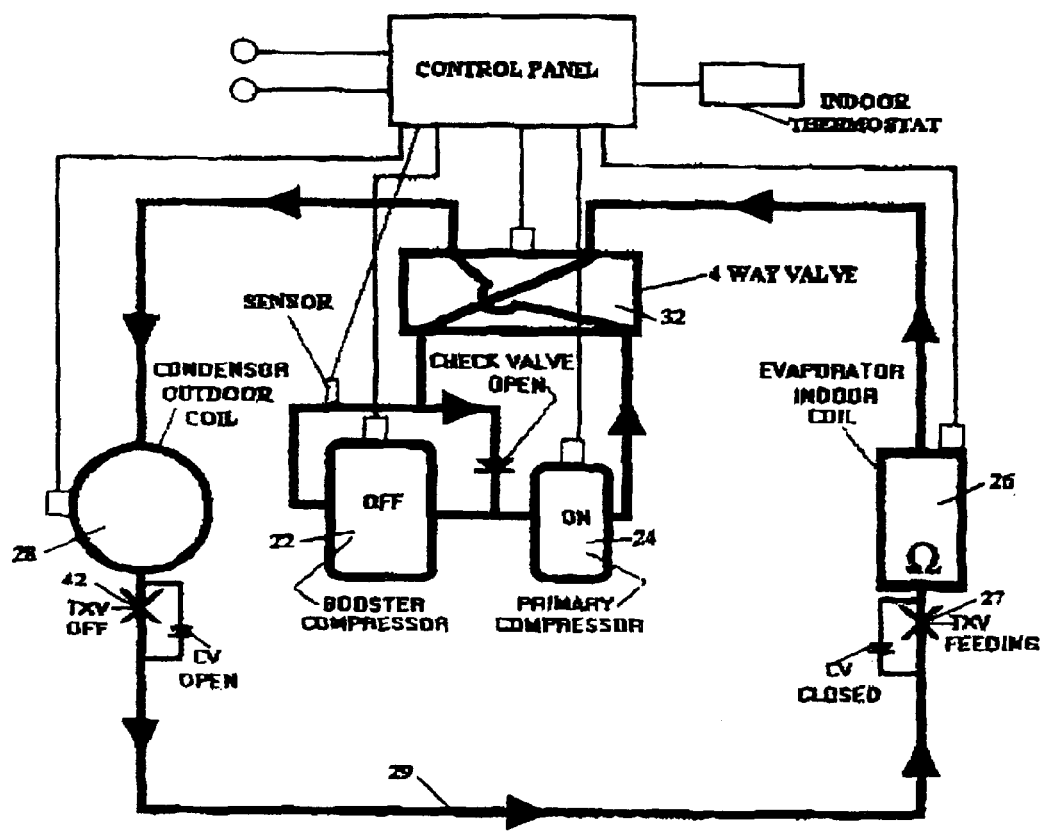
FIG. 4 is a schematic diagram of the heat pump system of the present invention in a cooling capacity mode of operation in which just the primary compressor is operating (either one speed, two speed or unloadable).

Cooling operation and/or defrost operation of the system is shown in FIG. 4. Four way valve 32 is repositioned so that the refrigerant discharged from primary compressor 24 is delivered, as shown by the flow arrows, to outdoor coil 28, which is now functioning as a condenser, and then around expansion valve 42 via the now open associated check valve. The refrigerant then flows through expansion valve 27 (since the associated check valve is closed) to coil 26, which is now functioning as an evaporator, and then back to the four way valve 32 and back to the inlet to primary compressor 24. In the system of the present invention, booster compressor 22 does not operate on the cooling cycle. There is either one cooling step, C1, where primary compressor 24 is a one speed or non-unloadable compressor operated at full capacity (Mode 2), or two cooling steps, where primary compressor 24 is a multi-capacity compressor, with the first cooling step, C1, being at partial capacity operation of the primary compressor (Mode 1), and the second cooling step, C2 being at full capacity operation of the primary compressor (Mode 2).

Line T1 of FIG. 6 reflects a system with one cooling step. In Mode 2, the thermostat calls for the single cooling step C1, which results in full capacity operation of primary compressor 24. As also shown in FIG. 6, for the T2 thermostat and all T3 thermostats, cooling step C1 called by the thermostat results in Mode 1 cooling operation where primary compressor 24 is operated at partial capacity. If the cooling capacity of the system in Mode 1 does not satisfy the thermostat, cooling step C2 will be called by the thermostat, resulting in Mode 2 operation where primary compressor 24 is operated at full capacity.

It will be understood that the heating and cooling sequences of operation shown in FIG. 6 are by way of illustration. Other heating and cooling sequences may be effected in conjunction with the particular components (compressors, economizer, backup heat, etc.) used in a system.

An important feature of the present invention is the incorporation of pressure sensor/transducer 30 in the refrigerant flow line upstream of the inlets to both primary compressor 24 and booster compressor 22. Pressure sensor 30 senses the pressure of the refrigerant upstream of the inlet to the compressors, i.e., approximately the system low side or suction pressure, which pressure is commensurate with outdoor ambient air temperature during all heating cycle modes of operation. That is, system low side pressure will rise with rising outdoor ambient temperature, and will fall with falling outdoor ambient temperature. Pressure sensor 30 delivers an electrical signal to a mini-microprocessor (preferably located in control panel 36), which serves to prevent outputs from control panel 36, which would otherwise occur in response to signals from indoor thermostat 34, to do some or all of the following in the heating mode of operation of the heat pump:

1. Prevent operation of booster compressor 22 whenever the system low side pressure is higher than a first predetermined level.
2. Prevent operation of economizer 42 whenever the system low side pressure is higher than a second predetermined level.
3. Prevent operation of electric resistance heat whenever the system low side pressure is higher than a third predetermined level.
4. Prevent partial operation of primary compressor 24 whenever the system low side pressure is below a predetermined level
5. Act as a system safety shutdown whenever the system low side pressure is below a predetermined level during all heating and cooling modes, which condition indicates, e.g., a loss of refrigerant charge.

Figure 3A:
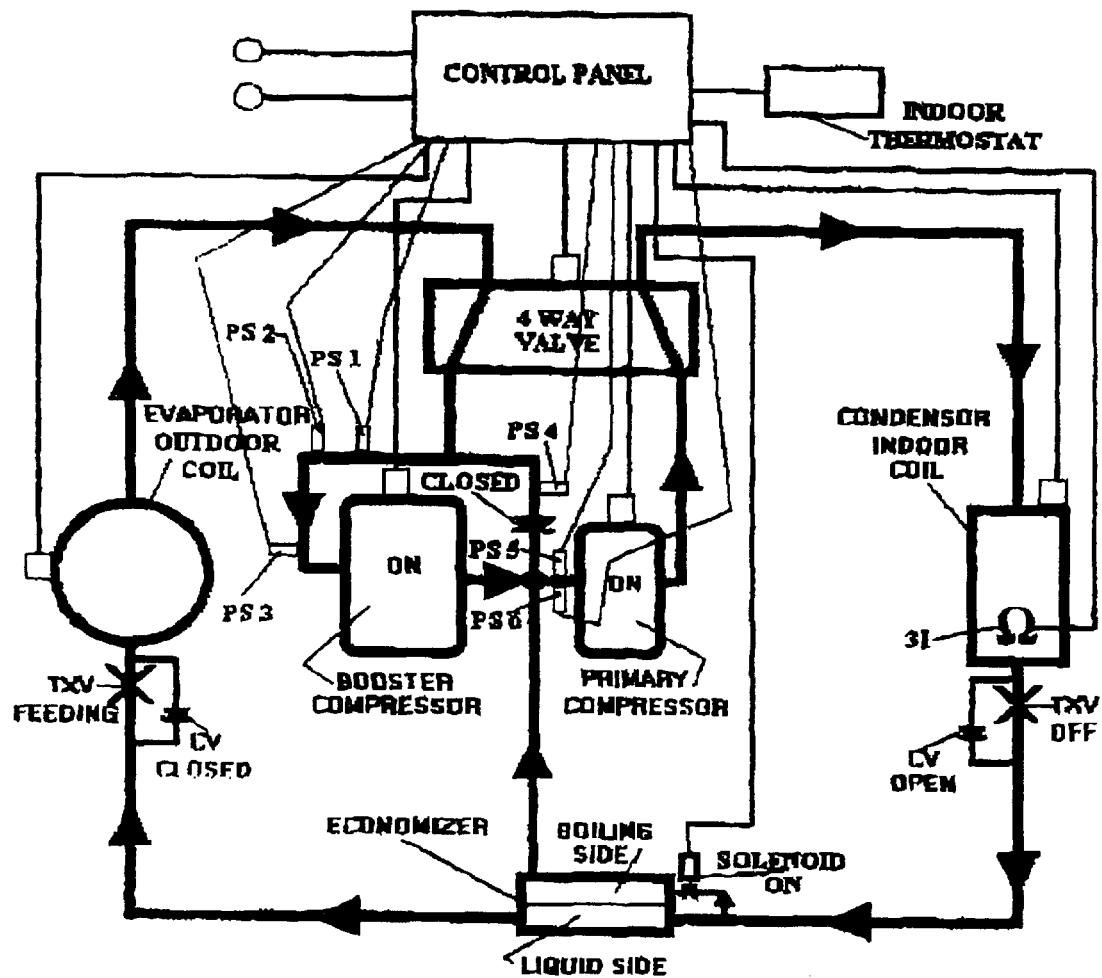
FIG. 3a is a schematic diagram of the heat pump system similar to FIG. 3, but incorporating a plurality of pressure sensors for various control purposes.

Instead of one pressure sensor and a microprocessor to accomplish some or all of the control features 1–5 itemized above, these features can be accomplished by employing a plurality of individual pressure sensors, all of which are positioned upstream of the inlet to either the primary compressor or the booster compressor to sense approximately system low side or suction pressure. The use of a microprocessor is then not required. FIG. 3a shows the system with six individual pressure sensors, PS1–PS 6, all of which are positioned to sense approximately the system low side or suction pressure.

PS 1 is connected to operate a normally open switch in the booster power line. PS 1 closes its associated switch when the sensed pressure falls to a preset point, thereby permitting operation of booster compressor 22 if called for by the indoor thermostat.

PS 2 is connected to operate a normally open switch in the power line to the economizer solenoid. PS 2 closes its associated switch when the sensed pressure falls to a preset point, thereby permitting operation of economizer 42 if called for by the indoor thermostat.

PS 3 is connected to operate a normally open switch in the power line to backup resistance heat 31. PS 3 closes its associated switch when the sensed pressure falls to a preset point, thereby permitting operation of backup heat 31 if called for by the indoor thermostat.

PS 4 is connected to operate a normally closed switch in the power line to primary compressor 24. PS 4 opens its associated switch when the sensed pressure falls to a preset point, thereby preventing operation of primary compressor 24 and acting as the system low pressure safety control when the system is operating in the cooling or defrost modes.

PS 5 is connected to operate two normally closed switches in the power lines to primary compressor 24 and booster compressor 22. PS 5 opens its two associated switches when the sensed pressure falls to a preset point, thereby acting as a system low pressure safety control by interrupting or preventing operation of both the primary compressor and the booster compressor when the sensed pressure indicates a safety condition, such as loss of refrigerant charge, when the system is operating in the heating mode.

PS 6 is connected to cause full capacity operation of the primary compressor 24 when the sensed pressure falls to a preset point, even if a particular thermostat is calling for partial capacity operation of the primary compressor. This prevents system operation at too low a refrigerant mass flow due to a thermostat calling for partial capacity operation of the primary compressor when outside air temperature is too cold for safe partial capacity operation of the primary compressor.

The switches associated with each of the pressure sensors PS 1–PS 6 are preferably located in control panel 36.

As is well known in the art, heat pump operation in the heating mode below a predetermined outdoor ambient temperature requires the use of a defrost cycle to remove frost or ice from evaporator coil 28. The defrost cycle may be initiated by a timing cycle or a demand measurement. In the timing cycle, defrost operation is initiated at set time intervals, whether needed or not. In the demand cycle, defrost operation is only on demand when called for by the presence of excessive frost/ice on coil 28. There are various direct and indirect system parameter measurements well know in the art that can be utilized to initiate a defrost cycle. Defrost is accomplished by moving four way valve 32 from the FIG. 1 position to the FIG. 4 position and adding thermal energy to vaporize the circulating refrigerant which is subsequently compressed for delivery to outdoor coil 28. In the prior art, heat for heating the refrigerant is typically obtained from direct cooling of the indoor air that was just previously being heated. Backup electric resistance heat is typically used to prevent cold drafts in the indoor air from which heat is being extracted for defrost.

The use of backup resistance heat to prevent cold drafts during a defrost cycle is expensive. It can also impose an electrical load requirement (e.g. 200 amp service) that many older residential systems (typically 100 amp capacity) may not be able to meet; and retrofitting for 200 amp service may be very expensive or not practicable. This is a problem of particular concern in larger cities having older multi-unit apartment or condo units. The present invention addresses that problem by using a defrost energy transfer fluid as the heat source for the defrost cycle. As used herein, the term "defrost energy transfer fluid" is defined to mean either water, such as the ordinary water supply to a building, or an available waste water source, or a non-freezing or low temperature freezing heat transfer fluid such as any suitable antifreeze.

Figure 5:
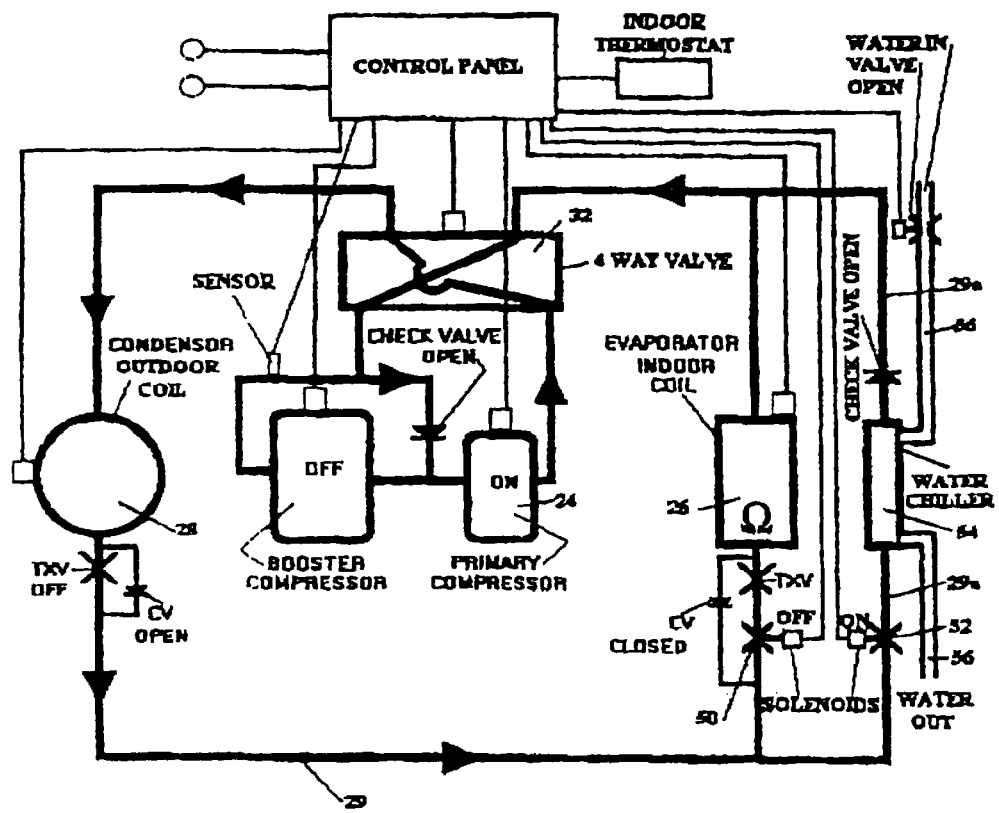
FIG. 5 is a schematic diagram of the heat pump system of the present invention in a defrost mode of operation and with a water defrost system.

The defrost energy transfer fluid feature for defrost is shown in FIG. 5. Assuming that the heat pump system has been operating in a heating mode, such as in any of FIGS. 1, 2 or 3, the four way valve will be moved to the cooling mode of operation, where the refrigerant will flow as indicated by the arrows in FIG. 5. A solenoid operated valve 50 is closed to prevent refrigerant flow to indoor coil 26; and a solenoid valve orifice 52 is opened so that flashed liquid refrigerant now flows through a bypass line 29a to a heat exchanger 54 where it is in heat exchange relationship with a defrost energy transfer fluid flowing in line 56. The liquid refrigerant from outdoor coil 28 will thus be evaporated by energy absorbed from the defrost energy transfer fluid in heat exchanger 54. The resulting refrigerant vapor will then flow through four way valve 32 to primary compressor 24 where it is compressed and heated during compression, and then again through the four way valve to outdoor coil 28 to defrost the outdoor coil. As indicated above, if water is the defrost energy transfer fluid, the water may be from any convenient source, such as the normal potable or waste water sources for the building or structure being heated by the system.

While preferred embodiments have been shown and described, various modifications and substitutions may be made without departing from the spirit and scope of this invention. Accordingly, it is to be understood that the foregoing invention has been described by way of illustration and not limitation.

What is claimed is:

1. A heat pump system including:
   a primary compressor;
   a booster compressor;
   a refrigerant conduit system, said primary compressor and said booster compressor being in series in said refrigerant conduit system;
   a control panel, said control panel being connected between a multi-step thermostat and said primary and booster compressors, said control panel receiving signals from the multi-step thermostat and delivering power to operate said primary compressor and said booster compressor in a predetermined sequence in response to steps of the thermostat; and
   at least one pressure sensor connected to said refrigerant conduit system for sensing refrigerant pressure at approximately the refrigerant low pressure side to generate signals to prevent or permit operation of said primary compressor or said booster compressor as a function of outdoor ambient temperature.

2. A heat pump system as in claim 1 wherein:
   said pressure sensor senses the pressure in said refrigerant conduit system at a location upstream of the inlets to each of said primary compressor and said booster compressor.

3. A heat pump system as in claim 1 including:
   a microprocessor for receiving signals from said pressure sensor to control operation of said primary compressor or said booster compressor as a function of outdoor ambient temperature.

4. A heat pump system as in claim 3 wherein the control of said primary compressor or said booster compressor is selected from the group comprising:
   a) prevent operation of said booster compressor when refrigerant system low side pressure is higher than a first predetermined level;
   b) prevent operation of back-up heat when the refrigerant system low side pressure is higher than a second predetermined level;
   c) heat pump system safety shutdown when refrigerant system low side pressure is below a predetermined level.

5. A heat pump system as in claim 1 wherein:
   said primary compressor is a multi-capacity compressor.

6. A heat pump system as in claim 5 wherein:
   said primary compressor is an unloadable compressor or multi-speed compressor.

7. A heat pump system as in claim 5 including:
   at least two pressure sensors connected to said refrigerant conduit system to sense refrigerant pressure at approximately the refrigerant system low pressure side, one of said pressure sensors being connected to prevent or permit operation of said primary compressor, and another of said pressure sensors being connected to prevent or permit operation of said booster compressor.

8. A heat pump system as in claim 5 including:
   at least three pressure sensors connected to said refrigerant conduit system to sense refrigerant pressure at approximately the refrigerant system low pressure side to control operation of said primary compressor and said booster compressor from the control group comprising:
   a) permit operation of said booster compressor when refrigerant system low side pressure falls to a first predetermined level;
   b) permit operation of back-up heat when refrigerant system low side pressure falls to a second predetermined level;
   c) prevent operation of said primary compressor when refrigerant system low side pressure falls to a third predetermined level when operating in the cooling mode;
   d) prevent operation of said primary compressor and said booster compressor when refrigerant system low side pressure falls to a fourth predetermined level when operating in the heating mode;
   e) cause full capacity operation of said primary compressor when outside ambient air temperature is too cold for safe partial operation of said primary compressor.

9. A heat pump system as in claim 1 including:
   a heat exchanger in heat exchange relationship with a section of said refrigerant conduit system when the heat pump system is operating in a defrost mode;
   a defrost energy transfer fluid supply for delivering defrost energy transfer fluid to said heat exchanger to supply energy to the refrigerant in said section for defrost operation of the heat pump system.

10. A beat pump system including:
    a multi-capacity primary compressor;
    a booster compressor;
    a refrigerant conduit system, said primary compressor and said booster compressor being in series in said refrigerant conduit system;
    a source of backup heat in said heat pump system;
    a control panel, said control panel being connected between a multi-step thermostat and said primary and booster compressors, said control panel receiving signals from the multi-step thermostat and delivering power to operate said primary compressor and said booster compressor in a predetermined sequence in response to steps of the thermostat; and
    at least one pressure sensor connected to said refrigerant conduit system for sensing refrigerant pressure at approximately the refrigerant low pressure side to generate signals to prevent or permit operation of said primary compressor, said booster compressor, and said backup heat as a function of outdoor ambient temperature.

11. A heat pump system as in claim 10 wherein the signals from said at least one pressure sensor are effective to:
    a) permit operation of said booster compressor when refrigerant system low side pressure falls to a first predetermined level;

b) permit operation of back-up beat when refrigerant system low side pressure falls to a second predetermined level;

c) prevent operation of said primary compressor when refrigerant system low side pressure falls to a third predetermined level when operating in the cooling mode;

d) prevent operation of said primary compressor and said booster compressor when refrigerant system low side pressure falls to a fourth predetermined level when operating in the heating mode;

e) cause full capacity operation of said primary compressor when outside ambient air temperature is too cold for safe partial operation of said primary compressor.

12. A heat pump system as in claim 11 including:

an economizer in said refrigerant conduit system;

and wherein signals from said at least one pressure sensor are effective to permit operation of said economizer when refrigerant system low side pressure falls to a predetermined level.

13. A heat pump system including:

a multi-capacity primary compressor;

a booster compressor;

a refrigerant conduit system, said primary compressor and said booster compressor being in series in said refrigerant conduit system;

a source of backup heat in said heat pump system;

a control panel, said control panel being connected between a multi-step thermostat and said primary and booster compressors, said control panel receiving signals from the multi-step thermostat and delivering power to operate said primary compressor and said booster compressor in a predetermined sequence in response to steps of the thermostat; and a plurality of pressure sensors connected to said refrigerant conduit system for sensing refrigerant pressure at approximately the refrigerant low pressure side to generate signals to prevent or permit operation of said primary compressor, said booster compressor, said economizer, and said backup heat as a function of outdoor ambient temperature.

14. A heat pump system as in claim 10 wherein die signals from said plurality of pressure sensors are effective to:

a permit operation of said booster compressor when refrigerant system low side pressure falls to a first predetermined level;

b) permit operation of back-up heat when refrigerant system low side pressure falls to a second predetermined level;

c) prevent operation of said primary compressor when refrigerant system law side pressure falls to a third predetermined level when operating in the cooling mode;

d) prevent operation of said primary compressor and said booster compressor when refrigerant system low side pressure falls to a fourth predetermined level when operating in the heating mode;

e) cause fall capacity operation of said primary compressor when outside ambient air temperature is too cold for safe partial operation of said primary compressor.

15. A heat pump system as in claim 14 including:

an economizer in said refrigerant conduit system;

and wherein signals from said plurality of pressure sensors are effective to permit operation of said economizer when refrigerant system low side pressure falls to a predetermined level.

16. A method of operating a heat pump system having a primary compressor, a booster compressor, and a multi-step thermostat, including the steps of:

a) permitting operation of said primary compressor when called for by a first step of said thermostat;

b) permitting operation of said booster compressor when called for by a second step of said thermostat;

c) sensing refrigerant pressure at approximately the refrigerant system low side pressure, said pressure being commensurate with outdoor ambient air temperature;

d) preventing operation of said booster compressor, even if called for by the thermostat, when refrigerant system low side pressure is higher than a predetermined level; and e) preventing operation of said booster compressor and said primary compressor, even if called for by the thermostat, when refrigerant system low side pressure is lower than a predetermined level.

17. A method of operating a heat pump system as in claim 16 in defrost mode, including the step of;

supplying water in heat exchange relationship with the refrigerant of the heat pump system to impart energy to the refrigerant for a defrost cycle.

18. A method of operating a heat pump system as in claim 16, wherein said heat pump system includes a source of backup heat, and including the steps of;

permitting operation of the source of backup heat when called for by a third step of said thermostat and when refrigerant system low side pressure is below a predetermined level.

19. A method of operating a heat pump system having a multi-capacity primary compressor, a booster compressor, and a multi-step thermostat, including the steps of:

a) permitting partial capacity operation of said primary compressor when called for by a first step of said thermostat;

b) permitting full capacity operation of said primary compressor when called for by a second step of said thermostat;

c) permitting operation of said booster compressor when called for by a third step of said thermostat;

d) sensing refrigerant pressure at approximately the refrigerant system low aide pressure, said pressure being commensurate with outdoor ambient air temperature;

e) preventing partial capacity operation of said primary compressor, even if called for by said thermostat, and requiring full capacity operation of said primary compressor when outdoor ambient temperature is too cold for safe partial capacity operation of said primary compressor f) preventing operation of said booster compressor, even if called for by the thermostat, when refrigerant system low side pressure is higher than a predetermined level; and g) preventing operation of said booster compressor and said primary compressor, even if called for by the thermostat, when refrigerant system low side pressure is lower than a predetermined level.

20. A method of operating a heat pump system having a multi-capacity primary compressor, a booster compressor, an economizer, and a multi-step thermostat, including the steps of: of:

a) permitting full capacity operation of said primary compressor when called for by a first step of said thermostat;

b) permitting operation of said booster compressor when called for by a second step of said thermostat;

c) permitting operation of said economizer when called for by a third step of said thermostat;

d) sensing refrigerant pressure at approximately the refrigerant system low side pressure, said pressure being commensurate with outdoor ambient air temperature;

e) preventing operation of said booster compressor, even if called for by the thermostat, when refrigerant system low side pressure is higher than a predetermined level;

f) preventing operation of said economizer when refrigerant system low side pressure is higher than a predetermined level; and g) preventing operation of said booster compressor and said primary compressor, even if called for by the thermostat, when refrigerant system low side pressure is lower than a predetermined level.

21. A method of operating a heat pump system having a multi-capacity primary compressor, a booster compressor, an economizer, a source of backup heat, and a multi-step thermostat, including the steps of:

a) permitting full capacity operation of said primary compressor when called for by a first step of said thermostat;

b) permitting operation of said booster compressor and said economizer when called for by a second step of said thermostat;

c) permitting operation of said source of backup heat when called for by a third step of said thermostat;

d) sensing refrigerant pressure at approximately the refrigerant system low side pressure, said pressure being commensurate with outdoor ambient air temperature;

e) preventing operation of said booster compressor, even if called for by the thermostat, when refrigerant system low side pressure is higher than a predetermined level;

f) preventing operation of said economizer when refrigerant system low side pressure is higher than a predetermined level;

g) preventing operation of said source of backup heat when refrigerant low side pressure is higher than a predetermined level; and h) preventing operation of said booster compressor and said primary compressor, even if called for by the thermostat, when refrigerant system low side pressure is lower than a predetermined level.

22. A heat pump system operating in the cooling mode, said system including:

a primary compressor;

a booster compressor;

a refrigerant conduit system, said primary compressor and said booster compressor being in series in said refrigerant conduit system;

a control panel, said control panel being connected between a multi-step thermostat and said primary and booster compressors, said control panel receiving signals from the multi-step thermostat and delivering power to operate only said primary compressor in a predetermined sequence in response to steps of the thermostat; and at least one pressure sensor connected to said refrigerant conduit system for sensing refrigerant pressure at approximately the refrigerant low pressure side to generate signals to prevent or permit operation of said primary compressor as a function of outdoor ambient temperature.

23. A heat pump system as in claim 21 wherein;

said primary compressor is a multi-capacity compressor;

said multi-capacity compressor being operated at partial capacity in response to a first step signal from said thermostat; and said multi-capacity compressor being operated at full capacity in response to a second step signal from said thermostat.

24. A method of operating a heat pump system in a cooling mode, said system having a primary compressor, a booster compressor, and a multi-step thermostat, including the steps of:

a) operating only said primary compressor;

b) sensing refrigerant pressure at approximately the refrigerant system low side pressure, said pressure being commensurate with outdoor ambient air temperature; and c) preventing operation of said primary compressor when refrigerant system low side pressure falls to a predetermined point.

25. A method of operating a heat pump system in a cooling mode as in claim 24, wherein said primary compressor is a multi-capacity compressor, and including the steps of;

a) operating said primary compressor at partial capacity in response to a first step signal from said thermostat; and b) operating said primary compressor at full capacity in response to a second step signal from said thermostat.

26. A defrost system for a heat pump, said heat pump having an outdoor coil, an indoor coil, at least one compressor, and a conduit system for circulating refrigerant to said compressor, said outdoor coil and said indoor coil, the defrost system including;

a) a bypass conduit for bypassing refrigerant around said indoor coil, b) a heat exchanger in said bypass conduit;

c) a defrost energy transfer fluid supplied to said heat exchanger for imparting energy to said refrigerant in said heat exchanger;

d) said refrigerant being delivered from said heat exchanger to said compressor for compression and then to said outdoor coil.

27. A method of defrosting an outdoor coil in a heat pump system, the heat pump system having an outdoor coil, an indoor coil, at least one compressor, and a conduit system for circulating refrigerant to said compressor, said outdoor coil and said indoor coil, including the steps of;

a) bypassing refrigerant around said indoor coil;

b) delivering a defrost energy transfer fluid in heat exchange relationship with said bypassed refrigerant to impart energy to said bypassed refrigerant;

c) delivering the refrigerant from the heat exchanger to said at least one compressor;

d) compressing said refrigerant in said compressor; and e) delivering said refrigerant from said compressor to said outdoor coil.

28. The method of defrosting as in claim 27 wherein, said defrost energy transfer fluid is water.

29. The method of defrosting as in claim 27 wherein, said defrost energy transfer fluid is antifreeze.

30. A defrost system for a heat pump as in claim 26 wherein:

the defrost energy transfer fluid is water.

31. A defrost system for a heat pump as in claim 26 wherein:

the defrost energy transfer fluid is antifreeze.

* * * * *